United States Patent [19]
Regnault
[11] Patent Number: 4,628,329
[45] Date of Patent: Dec. 9, 1986

[54] CIRCUIT FOR FEEDING INK TO AN INK-JET PRINTING HEAD

[75] Inventor: Luc Regnault, Bourg les Valence, France
[73] Assignee: Image S.A., Bourg les Valence, France

[21] Appl. No.: 740,049
[22] PCT Filed: Oct. 11, 1984
[86] PCT No.: PCT/FR84/00228
§ 371 Date: May 23, 1985
§ 102(e) Date: May 23, 1985
[87] PCT Pub. No.: WO85/01696
PCT Pub. Date: Apr. 25, 1985
[30] Foreign Application Priority Data
Oct. 13, 1983 [FR] France ............................... 83 16440
[51] Int. Cl.⁴ ...................... G01D 15/18; G01D 18/00
[52] U.S. Cl. ........................................ 346/75; 137/92; 346/140 R
[58] Field of Search ............... 346/75, 140; 73/304 R; 137/92, 91, 392

[56] References Cited

U.S. PATENT DOCUMENTS 3,835,881 9/1974 Dal ................................. 137/392 X
4,067,020 1/1978 Arway ................................. 346/75
4,130,126 12/1978 Chocholaty ...................... 137/91 X
4,314,264 2/1982 Box ..................................... 346/140
4,337,468 6/1982 Mizuno ............................ 346/75 X
4,346,388 6/1980 Wiley .................................. 346/75
4,403,227 9/1983 Bertschy .............................. 346/75
4,422,085 12/1983 Sumitomo ......................... 346/140

FOREIGN PATENT DOCUMENTS 0046385 2/1982 European Pat. Off. .
0076914 4/1983 European Pat. Off. .
3043260 6/1981 Fed. Rep. of Germany .
3247225 7/1983 Fed. Rep. of Germany .

*Primary Examiner*—Joseph W. Hartary
*Attorney, Agent, or Firm*—Roland Plottel

[57] ABSTRACT

The invention relates to a circuit for feeding ink to an ink-jet printing head.

Consideration is given to a circuit comprising in particular a first auxiliary circuit (R1), the function of which is to measure the ink pressure between the feed pipe (20) and the ink supply pipe (18) and a second auxiliary circuit R2 which serves if necessary to clear the orifice (41) for discharging ink drops (100).

This circuit can also comprise a third auxiliary circuit R3 for delivering a signal which is representative of the viscosity of the ink.

Measurement of the pressure and of the viscosity permits control of the principal parameters governing the operation of the printer which is equipped with the circuit.

The invention applies to any ink-jet printer.

8 Claims, 2 Drawing Figures

CIRCUIT FOR FEEDING INK TO AN INK-JET PRINTING HEAD

The invention relates to a circuit for feeding ink to an ink-jet printing head. It is also concerned with any printer which is equipped with said circuit.

A number of problems arise in the ink-jet printing technique and the chief problems are recalled below. In the first place, the orifice employed for the formation of the jet is of small size (of the order of 75 microns) and there is a possibility that it may be choked by a dust particle. It is important in this case to have a rapid means for clearing this orifice.

Furthermore, the printing qualities of a printer of this type are intimately related to the rate of discharge of ink through the orifice. The rate of discharge is liable to be modified as a result of variation in pressure of the ink upstream of the orifice and also as a result of a variation in viscosity of the ink. This latter may arise from evaporation loss of the ink solvent which is often highly volatile.

The precise aim of the present invention is to solve all these problems and relates to a circuit for feeding ink to a printer which is of simple constructional design, provides very flexible operation and makes it possible with a minimum number of components (two pumps and four electrovalves) to obtain in particular a control of pressure and viscosity of the ink.

The invention is more precisely concerned with a circuit for feeding ink to an ink-jet printing head, of the type comprising an ink reservoir, the bottom wall of which has a first outlet connected to a pipe for supplying ink to a pressurizing pump which feeds the body of the printing head via a feed pipe 20; an inlet connected to a delivery pipe which conveys the unused ink withdrawn at the level of a recovery trough and aspirated by means of a depressurizing pump; and a second outlet connected to a wetting pipe joined to the depressurizing pump; the feed circuit being characterized in that it additionally comprises a first auxiliary circuit mounted between the ink supply pipe and the feed pipe and capable of measuring the pressure existing within the feed pipe.

The invention is also concerned with an ink feed circuit which is also equipped with a second auxiliary circuit comprising a combination of electrovalves which are capable of carrying out the clearing of the inkdrop discharge orifice and producing a positive interruption of the ink jet.

It is also concerned with an ink feed circuit equipped with a third auxiliary circuit comprising means for measuring the viscosity of the ink.

It is finally concerned with a circuit of this type equipped with means for treatment of solvent vapors before discharging them into the ambient atmosphere.

A better understanding of the invention will be gained by means of the following explanations and accompanying figures, wherein.

For the sake of enhanced clarity, the same elements are designated by the same references in all the figures.

Figure 1:
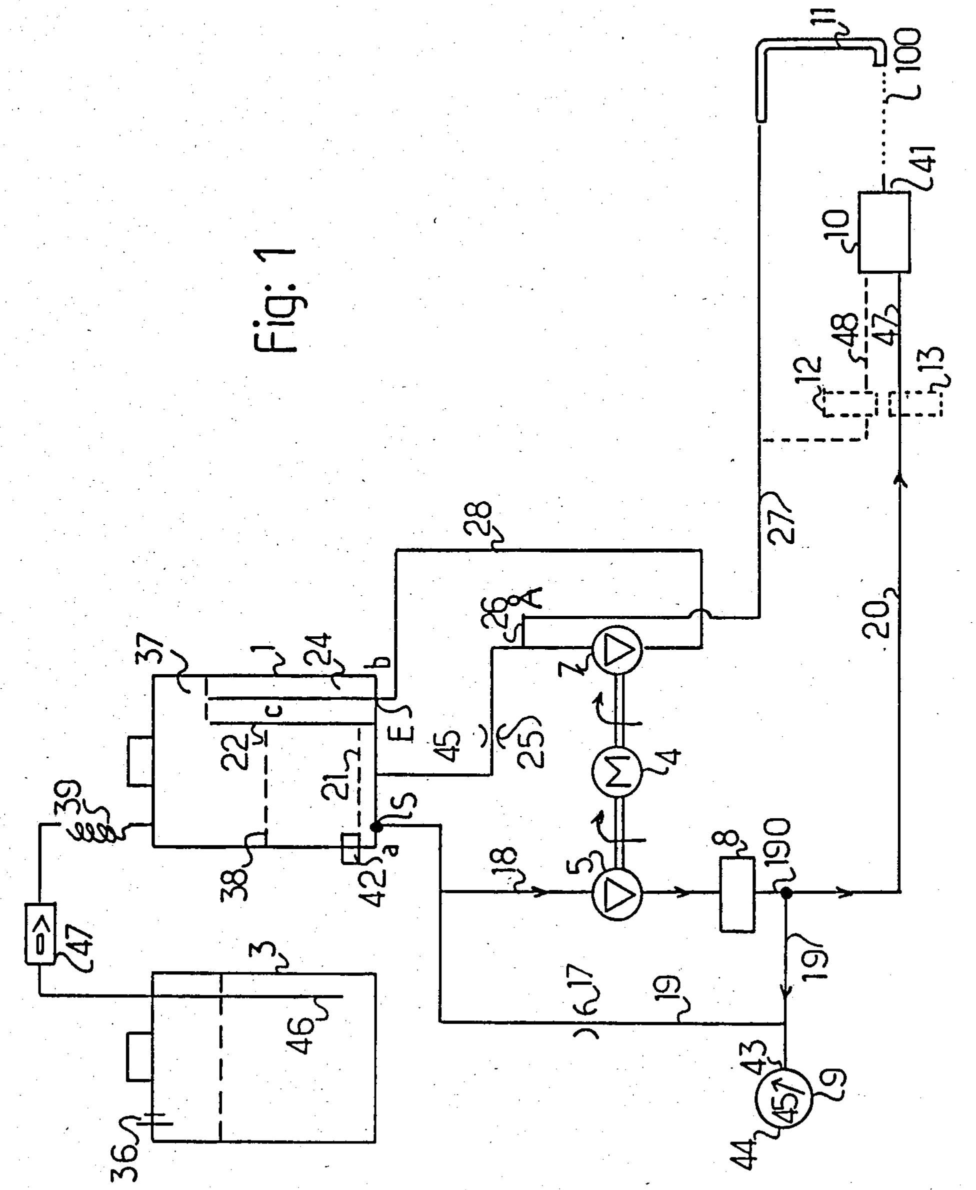
FIG. 1 is a schematic illustration of one example of construction of an ink feed circuit for supplying ink to a printing head in accordance with the invention.

FIG. 1 therefore illustrates schematically a circuit for feeding ink to an ink-jet printing head 10. A circuit of this type essentially comprises an ink pressurization circuit and a depressurization circuit for sucking unused ink drops 100 at the level of the recovery trough 11.

The ink is stored in a sealed reservoir 1 which, in accordance with the invention, comprises an internal partition 22 placed parallel to the side walls of the reservoir, therefore at right angles to the bottom wall (ab) of this latter.

The ink level 38 which is always lower than the height 37 of the internal partition 22 falls progressively from this level to the bottom of the reservoir. The bottom level 21 of the ink is detected by means of a sensor 42. This ink is conveyed by means of a feed pipe 18 which passes through the bottom wall (ab) of the reservoir 1 to a pump 5 which is driven by a motor 4. The output of the pump 5 is proportional to the speed of rotation of the motor 4. The ink delivered by the pump 5 passes through a filter 8, a two-way duct 190, one way being referred-to as a feed pipe which is designated by the reference 20 and conveys the ink to the printing head 10, the other way being referred-to as a return pipe which is designated by the reference 19 and returns the ink through a calibrated leak 17 to the feed pipe 18.

The leak 17 makes it possible to produce a pressure drop which is proportional to the rate of ink flow through this latter.

During normal operation, the flow rate within the feed pipe 20 is wholly negligible with respect to the output flow of the pump 5 which passes through the leak 17. The pressure of the pipe 18 downstream of the leak 17 is in the vicinity of atmospheric pressure, thus implying from the flow rate produced by the leak 17 and by the pump 5 that the pipes 19 and 20 are at a pressure which is higher than atmospheric pressure and practically proportional to the speed of rotation of the motor 4.

In accordance with the invention, a pressure sensor 9 is interposed in the pipe 19. In one example of construction, this sensor 9 comprises electric contacts 44 and 43 for delivering the pressure zone to be maintained. The sensor also includes a feeler 45 which moves according to the measured pressure. This combination of the feeler 45 and contacts 44 and 43 makes it possible to obtain a signal and to utilize an associated electronic device (not shown) which continuously controls the speed of the motor 4 so that the pressure within the pipes 19 and 20 is maintained at a fixed and predetermined range irrespective of the variation in parameters which govern it such as, for example, internal leakages within the pump or faulty calibration of the leak 17.

This first auxiliary circuit in accordance with the invention and designated by the reference R2 therefore ensures a stable pressure.

In accordance with another characteristic feature of the invention, a depressurization circuit cooperates with the pressurization circuit described earlier, the function of which is to recover at the level of the trough 11 the ink drops which are emitted by the head 10 and are not used for printing.

For this purpose, there is employed a pump referred-to as a depressurizing pump 7 which is of the same type as the pump 5 referred-to as a pressurizing pump. These two pumps 5 and 7 can be connected to the same motor 4.

The pump 7 is a displacement pump which normally produces a flow of liquid. By way of example, a gear-type pump can be employed. The ink drops 100 which are recovered at the level of the trough 11 are sucked through a so-called suction pipe 27.

This result can be obtained only if the pump 7 is capable of producing an air flow, that is, as soon as the system is started-up, when the suction pipe 27 still contains no ink.

This type of pump (gear-type pump, for example) may have internal leakages. These are negligible in the case of a liquid but are preponderant in the case of gases.

On the other hand, a pump of this type is perfectly capable of operating with a gas if its internal elements remain continuously wetted by a liquid which accordingly has the effect of obstructing leakages. In accordance with the invention, this result is obtained by the combination of means which is now described. The bottom wall (a, b) of the reservoir 1 is equipped with a so-called wetting pipe 45 which conveys ink withdrawn from this reservoir 1 via a leak 25 to the depressurizing pump 7, thus having the effect of continuously wetting its internal elements. Under these conditions, the pump can fully accomplish its sucking function, namely that of sucking air through the pipe 27. The flow rate of ink derived from the pipe 45 is limited by the leak 25 so as to ensure that it always remains below the volume flow rate produced by the pump 7. In this manner, this pump can generate a partial vacuum within the pipe 27, an extension 26 of which is closed-off at A and intended to be connected if necessary to a device for measuring the viscosity of the ink as will be described hereinafter. This operation of the pump 7 takes place and this partial vacuum is therefore created even if the pipe 27 and its extension 26 contain a high proportion of air.

The pump 7 which is continuously wetted by ink supplied from the reservoir 1 through the leak 25 therefore sucks air and recovered ink derived from the recovery trough 11. The ink and air are discharged to the sealed reservoir 1 via a so-called discharge duct 28 and, in accordance with a characteristic feature of the invention, this pipe 28 is connected to a rigid duct 24 which is perpendicular to the bottom wall (a, b) of the reservoir 1 and located within the compartment C delimited by the partition 22. This discharged ink is obviously derived from the trough 11 but also from the wetting pipe 45. In consequence, even if no ink flow is recovered at the level of the trough 11, a minimum ink return flow to the sealed reservoir 1 via the rigid duct 24 is maintained by virtue of the ink derived from the wetting circuit 45. The result thereby achieved is to obtain a constant level 37 of ink which overflows above the internal partition 22.

Air is also discharged into the sealed reservoir 1. It is evacuated to the exterior through a tube coil 39, a nonreturn valve 47 and a pipe 46 immersed in a liquid contained in a reservoir 3 which traps the solvent contained in the air before being discharged to free air through the orifice 36. In fact, the air recovered at the level of the trough 11 circulates with the ink in the pipes 27 and 24 and is saturated with solvent, especially if this latter is highly volatile. The function of the tube coil is to produce maximum condensation of the solvent contained in the air, whereupon the solvent returns to the reservoir 1 under the action of gravity. The air which cannot be completely freed from all the solvent vapors therefore passes through the bubbling reservoir 3 which traps these vapors by dissolution.

If the trough 11 is obstructed, the pipe 27 attains the maximum degree of vacuum which can be produced by the pump 7. If the printer is stopped at this moment, the pipe 27 will suck from the reservoir 1 ink which can be replaced only by air supplied through the orifice 36. In this case, the nonreturn valve 47 prevents any return of bubbling liquid into the ink as this would entail the need for complete draining of the circuits.

The circuit R2 which provides a connection with the printing head is now described. The body 10 of this printing head which supports the orifice 41 for producing the jet 100 can be pressurized as required by the operator by means of an electrovalve 13 which is connected to the head via a pipe 47. A so-called drain-off electrovalve 12 connects the pipe 27 of the depressurization circuit to a pipe 48 which is at the same pressure as the body 10.

During normal operation, the electrovalve 13 is in the open position and the electrovalve 12 is in the closed position.

This latter performs three essential functions. In the first place, after stoppage of the machine over an extended period of time, the pipe 20 may contain degraded ink, especially if this period is of long duration. It may be useful in this case to replace this ink with fresh ink supplied from the reservoir 1. The ink-jet discharge rate cannot make it possible to carry out this operation at high speed whereas opening of the electrovalve 12 makes it possible to produce a high rate of flow within the pipe 20 and within the body 10 and therefore to refresh the ink rapidly.

Secondly, the presence of this electrovalve 12 permits easy clearing of the orifice 41 if it is choked by a dust particle, for example. To this end, the electrovalve 13 is closed and the electrovalve 12 is opened, with the result that the body 10 is accordingly at negative pressure. Under these conditions, it is possible to suck solvent through the orifice 41 and thus to drive the dust particle towards the pipe 48.

Thirdly, the electrovalve 12 has the function of ensuring a positive interruption of the ink jet during the printer shutdown procedure. In fact, when the jet is in operation, the ducts 47 and 48 which are under pressure inflate to a slight extent, especially if they are of plastic and have substantial lengths. When the electrovalve 13 is closed in order to cut-off the jet, the residual pressure within 47 and 48 is such that the jet cannot be cut-off immediately by reason of its low discharge rate. This inevitably results in pollution of the jet environment, which is to be avoided. The original structural design of the ink feed circuit in accordance with the invention makes it possible to overcome these disadvantages. In fact, when it is desired to cut-off the jet, the electrovalve 12 is opened shortly before closing of the electrovalve 13. When closing of this latter takes place, the residual pressure within the ducts 47 and 48 cannot remain as a result of preliminary opening of the electrovalve 12. This latter is then re-closed shortly after closing of the electrovalve 13. The jet has been positively cut-off and the environment is not contaminated. The sequence of opening and closing of the electrovalves is programmed in a known manner.

Figure 2:
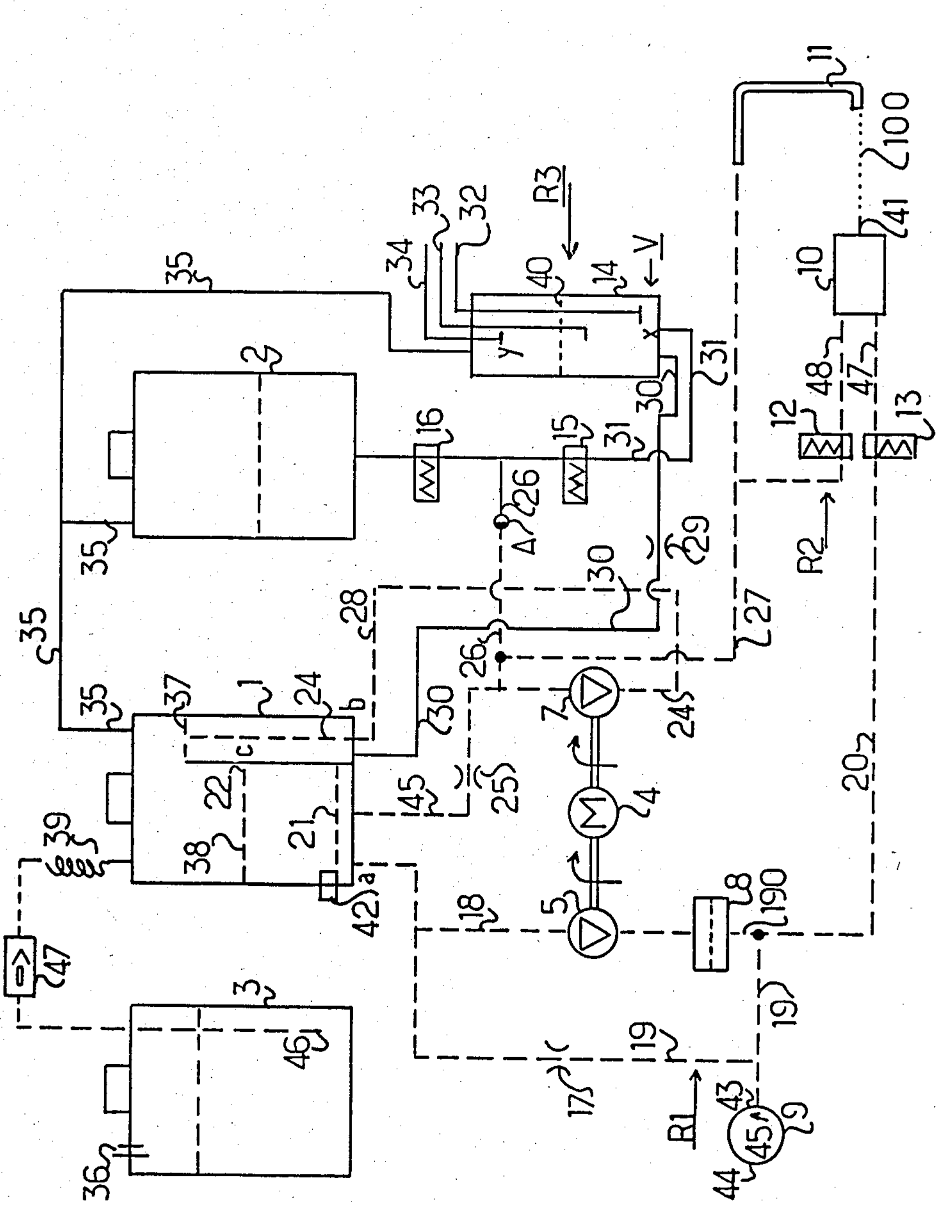
FIG. 2 is a schematic illustration of one example of construction of a device which is capable of measuring the viscosity of the ink and cooperates with the pressurization circuit of FIG. 1.

FIG. 2 shows diagrammatically one example of construction of a device which is capable of measuring the viscosity of the ink, which is designated as a viscosimeter V in the remainder of the description and which cooperates in accordance with the invention with the pressurization circuit described earlier with reference to FIG. 1. This is a third circuit R3.

This viscosimeter (V) is essentially constituted by a vessel 14 connected to the compartment C delimited within the reservoir 1 which is so designed as to be positioned at a higher level than the vessel 14. It should be recalled that the level 37 of the liquid is maintained constant within this compartment C. This vessel 14 is provided with three electrodes 32, 33, 34 which extend downwards within said vessel to different levels and which serve to detect a bottom level and a top level by electrical conduction. It must be remembered that the ink is conducting. The ink will be above the bottom level (x) when the electrodes 32 and 33 are subsequently in short-circuit; on the other hand, the ink will be at the top level (y) when the electrodes (32) and (34) are subsequently in short-circuit.

The flow of ink through the duct 30 makes it possible to fill the vessel 14; the pressure equilibrium at the liquid surfaces 37 within the compartment C and 40 within the vessel 14 is achieved by means of a pipe 35 which contains only air and solvent vapors.

Since the differences in height between the constant level 37, the end of the electrode 33 (corresponding to the bottom level), the end y of the electrode 34 (corresponding to the top level), the volume of the container 14 and the diameter of the leak 29 are known, the filling time tr between levels x and y depends only on the rate of flow of ink through leak 29 and on the volume of the container 14 between these levels. Because (i) the pressures are identical at the liquid surfaces 37 within compartment C and surface 40 within vessel 14, (ii) the volume of the container 14 is known, and (iii) and the differences in height between the constant level 37, the end of the electrode 33 (corresponding to the bottom level), the end of the electrode 34, (corresponding to the top level), are known, the filling time tr between x and y relates directly with the flow characteristics (the viscosity) of the ink.

An electrovalve 15 cooperates with the viscosimeter (V) in the manner described below. The electrovalve 15 puts the bottom of the vessel 14 into communication with the point A, that is to say with the pipe 26 of the depressurization circuit described with reference to FIG. 1. The ink of the vessel 14 is then sucked through the duct 31, thus making it possible to empty the vessel 14. To this end, the emptying flow rate within the duct 31 must be higher than the filling flow rate within the inlet pipe 30. When the ink level becomes lower than the end of the electrode 33, the bottom level is reached, the electrovalve 15 is closed and the counter is reset to zero; the vessel 14 is again being filled in order to proceed to another measure as follows. As the ink level, (now moving up) reaches the end of the electrode 33 (corresponding to the bottom level) the counter is initiated. The latter is stopped when the ink level has reached the end of the electrode 34 (corresponding to the top level) and the filling time tr in the counter is transmitted to the control unit.

When the viscosity increases, in particular by reason of a loss of ink solvent by evaporation, the filling time (tr) increases. As soon as it reaches a reference value considered as a limit, the viscosity is then stepwise corrected by successive additions of a fixed amount of solvent followed by a viscosity measurement.

To this end, an electrovalve 16 is provided for connecting a reserve supply 2 containing pure solvent to the point A, that is to say the pipe 26 which is at reduced pressure. This solvent is then delivered by the pump 7 to the reservoir 1.

It is also possible to control the operation of the electrovalves 15 and 16 continuously as a function of the parameters collected at the level of the electrodes 32, 33 and 34 of the viscosimeter V and therefore to correct the viscosity of the ink continuously by addition of solvent when this is necessary.

The sealed vessel 2 is connected to the pipe 35 which permits replacement of the solvent by air without putting it in contact with the surrounding air, thus offering the considerable advantage of avoiding the risks of pollution of the environment, especially undesirable odors. It should be noted that the air which replaces the liquids employed such as ink within the reservoir 1 and the solvent within the vessel 2 is supplied only from the recovery trough 11. The excess quantity of air which must exist escapes through the orifice 36 after bubbling within the reservoir 3. The vessels 1 and 2 are therefore at a slight overpressure due to the height of liquid within the vessel 3.

As in the case of FIG. 1, the circuit for coupling the two electrovalves 12 and 13 is provided and operates in the manner which was described earlier.

An ink-jet printer equipped with an ink feed circuit in accordance with the invention makes it possible to solve the principal problems presented by this type of machine, that is to say in particular:

obtainment of a stable pressure;
control of viscosity of the ink;
clearing of the ink-jet discharge orifice;
positive interruption of the jet.

All these results are obtained by means of a simple device which is easy to utilize in practice solely by means of two pumps and four electrovalves. The invention applies to any type of ink-jet printer.

I claim:

1. A circuit for feeding ink to an ink-jet printing head comprising an ink reservoir, said reservoir having a bottom wall, a first pipe connected at one end thereof to a first outlet in said bottom wall, a pressurizing pump connected to another end of said first pipe so that ink is supplied thereto, communication means connecting said pressurizing pump to said printing head for supplying ink thereto, a wetting pipe connected at one end thereof to a second outlet in said bottom wall, a depressurizing pump connected to another end of said wetting pipe, a recovery trough positioned to receive unused ink from said printing head in fluid communication with said depressurizing pump for drawing ink therefrom, means connecting said depressurizing pump with an inlet to said reservoir for conveying said unused ink to said reservoir, and a viscosimeter placed at a lower level than said reservoir comprising a vessel, three electrodes extending downwardly within said vessel, each electrode terminating at a different fluid level so as to detect a top fluid level and a bottom fluid level, whereby filling time between the bottom fluid level and the top fluid level can be determined and thereby the viscosity of the ink, and means for adding solvent to said viscosimeter when a reference value of the viscosity considered as a limit is attained.

2. The circuit according to claim 1, wherein said means for adding solvent to said vicosimeter comprises first and second electrovalves, said first electrovalve being in fluid communication with the bottom of said vessel and said depressurizing pump so that when said first electrovalve is open, said vessel is being filled, and when said vessel is draining said first electrovalve is then closed.

3. The circuit according to claim 2, wherein said second electrovalve is connected between said depressurizing pump and a reserve tank for storing pure solvent, whereby said solvent is supplied to said reservoir when said second electrovalve is open.

4. The circuit according to claim 3 wherein said reserve tank is sealed and connected to a pipe which is common to said reservoir and to said vessel so that said solvent is replaced by air from said depressurizing pump.

5. The circuit according to claim 3, further comprising a second reservoir having an orifice therein so that excess air will escape through said orifice after bubbling through second reservoir.

6. The circuit according to claim 3, further comprising a discharge orifice in said printing head, and means cooperating therewith for clearing said discharge or orifice.

7. The circuit according to claim 6, wherein said clearing means comprises first and second electrovalves in fluid communication with said printing head whereby opening of said first electrovalve produces a substantial rate of flow within said printing head and thus ensures draining of ink therein, and closing said second electrovalve and opening said first electrovalve permits suction of solvent at the level of said discharge orifice to thereby clear said discharge orifice, and opening said first electrovalve prior to closing said second electrovalve prevents any residual pressure within the communication means between said first and second electrovalves and said printing head, thus insuring positive interruption of the jet.

8. The circuit according to claim 7 further comprising means for measuring the pressure within said communication means between said pressurizing pump and said printing head.

* * * * *